Figure 7:
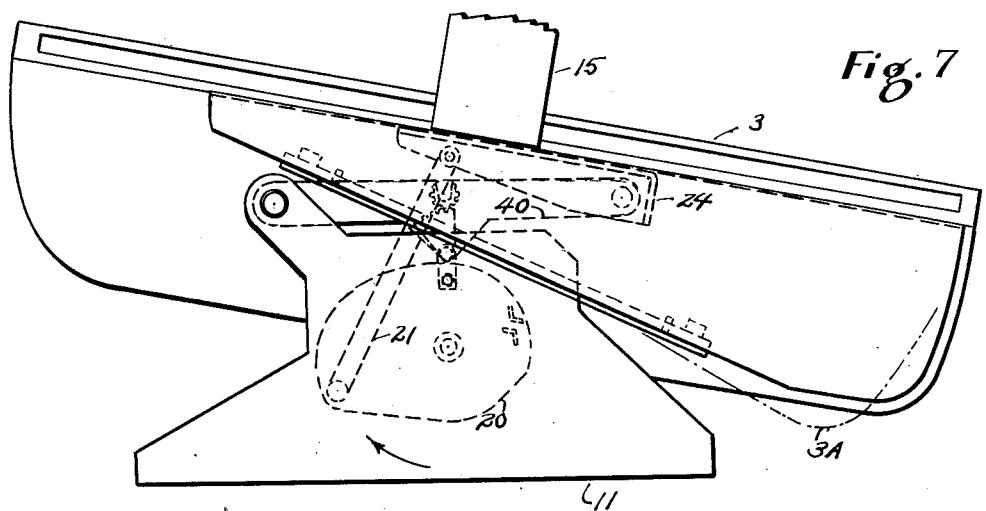

June 1, 1954        R. J. STAVA        2,680,046
X-RAY TABLE TILTING MECHANISM
Filed June 3, 1950        7 Sheets-Sheet 1
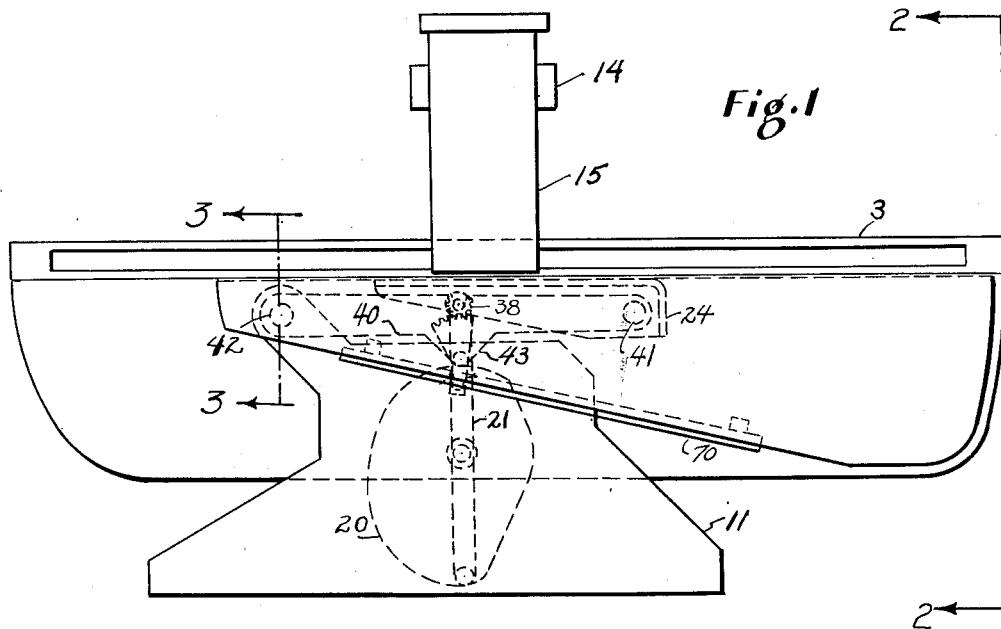
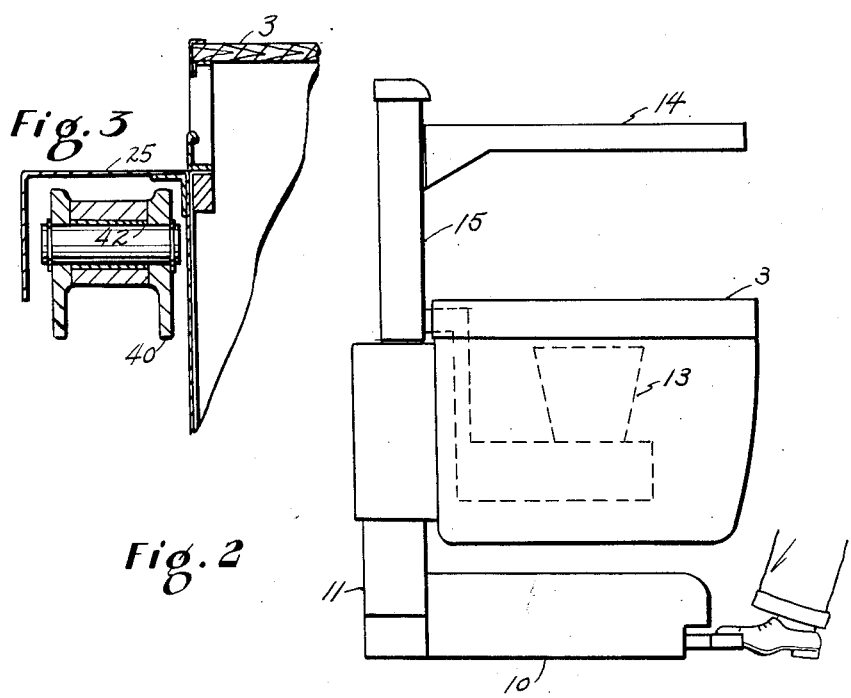
INVENTOR.
Robert J. Stava
BY Bates, Teare, & McBean
Attorneys

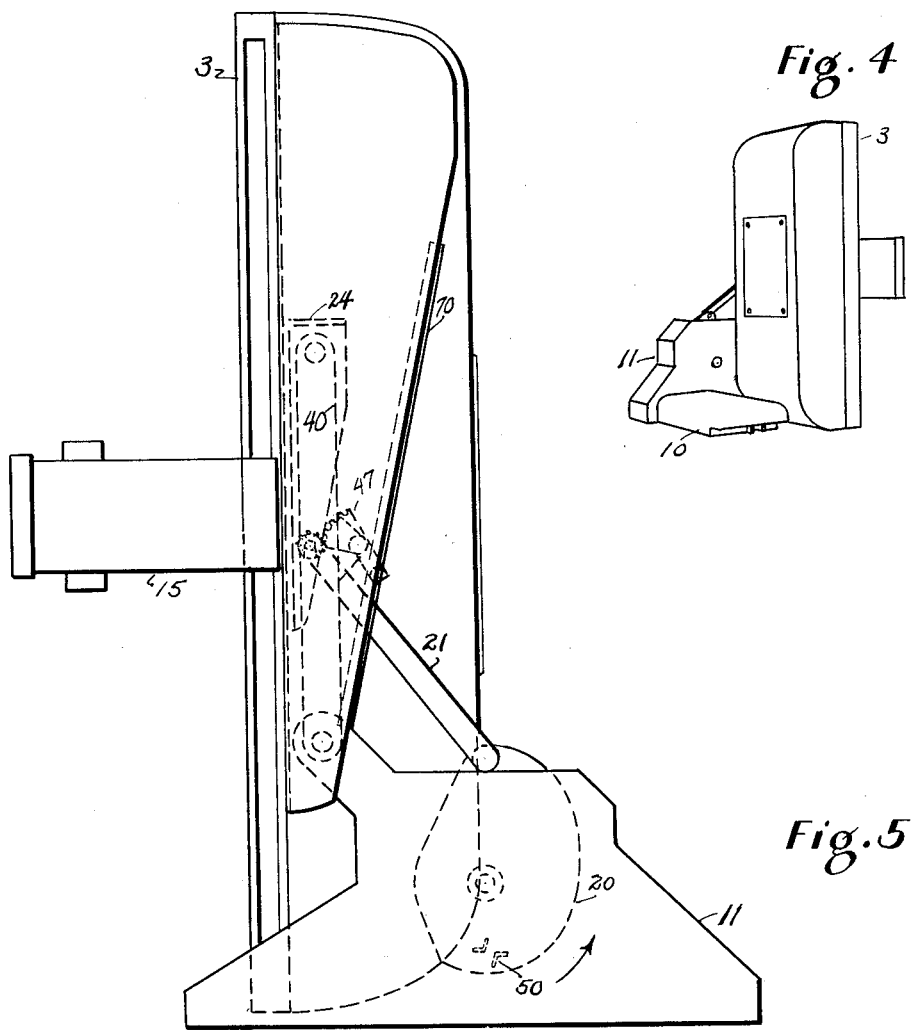
Fig. 4
Fig. 5
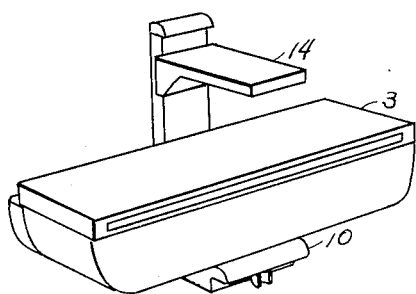
Fig. 6
INVENTOR.
Robert J Stava
BY Bates, Teare & McBean
Attorneys June 1, 1954  R. J. STAVA  2,680,046
X-RAY TABLE TILTING MECHANISM
Filed June 3, 1950  7 Sheets-Sheet 3

INVENTOR.
Robert J. Stava
BY Bates, Teare & McBean
Attorneys

June 1, 1954 R. J. STAVA 2,680,046
X-RAY TABLE TILTING MECHANISM
Filed June 3, 1950 7 Sheets-Sheet 5
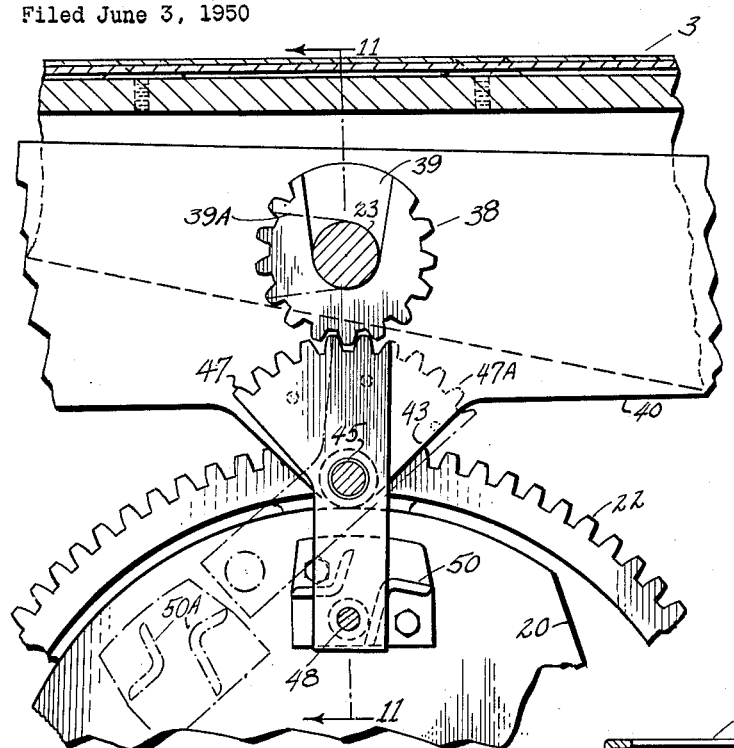
Fig. 12
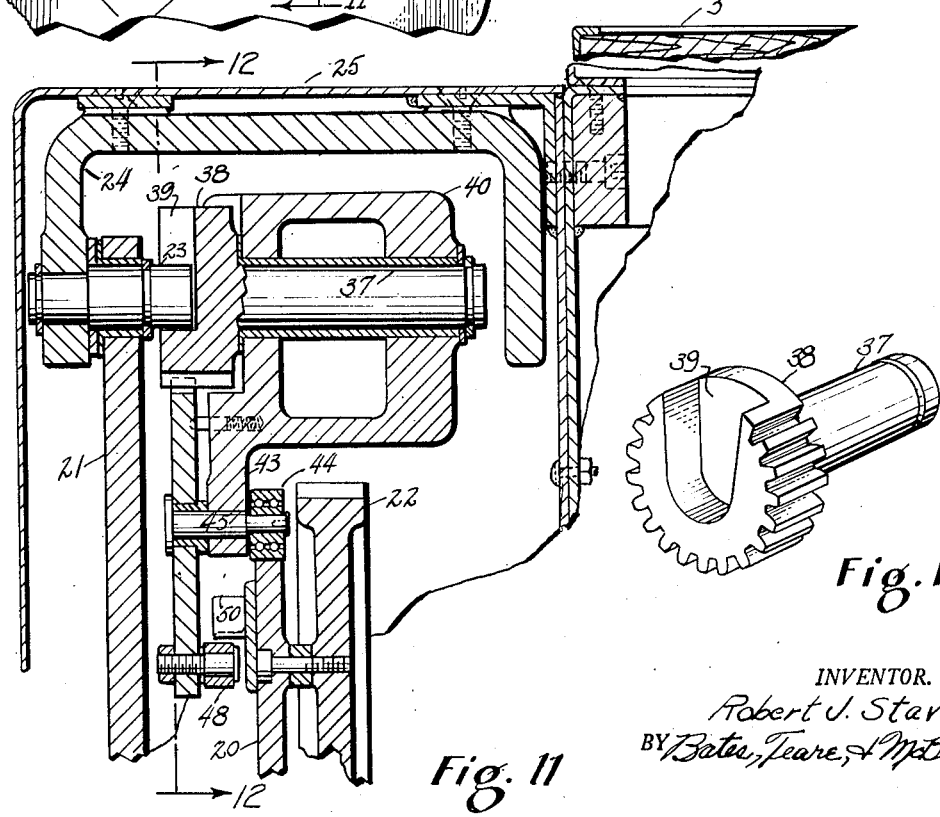
Fig. 11
Fig. 13
INVENTOR.
Robert J. Stava
BY Bates, Teare, & McBean
Attorneys June 1, 1954 R. J. STAVA 2,680,046
X-RAY TABLE TILTING MECHANISM
Filed June 3, 1950 7 Sheets-Sheet 6

INVENTOR.
Robert J. Stava
BY Bates, Teare, & McBean

Attorneys

June 1, 1954  R. J. STAVA  2,680,046
X-RAY TABLE TILTING MECHANISM
Filed June 3, 1950  7 Sheets-Sheet 7
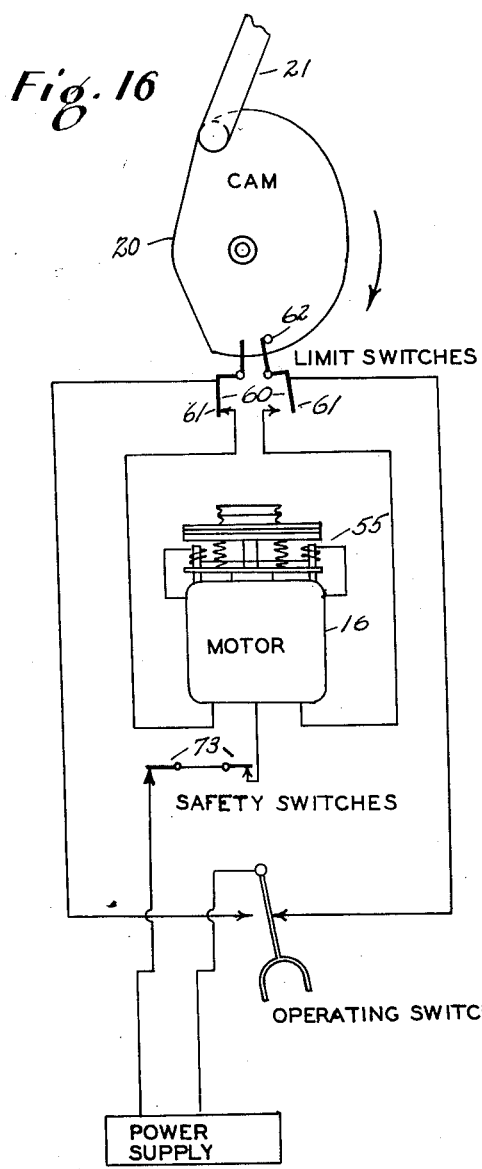
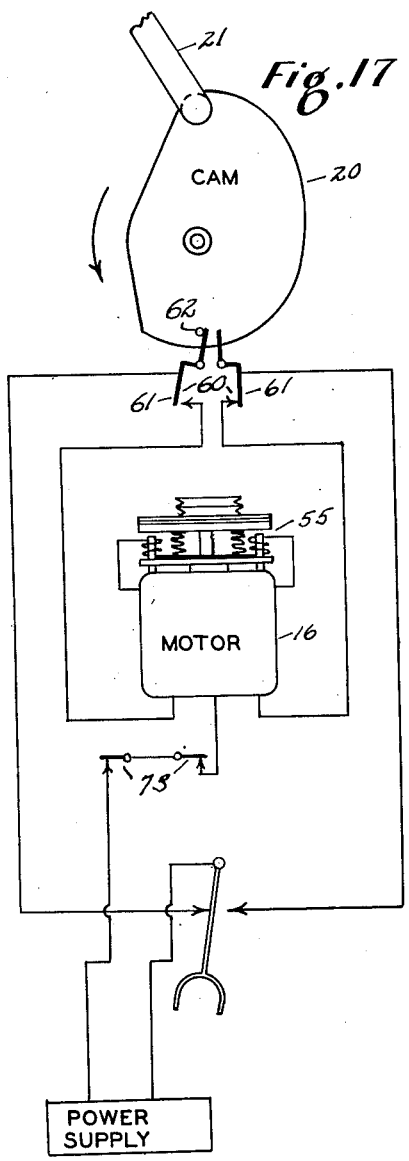
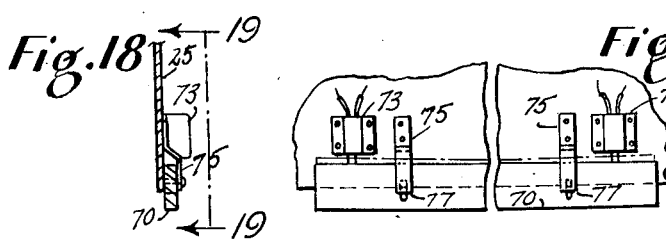
INVENTORS
Robert J. Stava
BY Bates, Teare & McBean
Attorneys Patented June 1, 1954

2,680,046

UNITED STATES PATENT OFFICE 2,680,046

X-RAY TABLE TILTING MECHANISM

Robert J. Stava, University Heights, Ohio, assignor to Picker X-Ray Corporation, Waite Manufacturing Division, Inc., Cleveland, Ohio, a corporation of Ohio Application June 3, 1950, Serial No. 166,015

9 Claims. (Cl. 311—6)

This invention relates to X-ray tilt-table apparatus, and more particularly to a tilting method and mechanism for an X-ray tilt-table.

The manner of use and method of operation of an X-ray tilt-table depends upon the particular type of information sought and the corresponding treatment. Many different types of X-ray tilt-table apparatus operations have been developed for adaptation to the various techniques of diagnosis and treatment such as radiography, fluoroscopy, and myelography. Because of the different techniques, many of the prior art apparatus are limited in use to a particular type of examination. Attempts have been made to combine the various features for adaptation to several types of examinations, but such attempts have usually resulted in imposing limitations upon the manner of conducting certain of these examinations.

By way of example, in the examination of the spinal column, or myelographic examination, the technique requires that the patient be placed upon the table in a prone position whereupon a puncture of the lumbar spine is made. Thereafter a measured volume of liquid is removed and replaced by an iodized oil or other X-ray opaque medium having a higher specific gravity than the spinal fluid and therefore subject to an action analogous to mercury within a tube.

The examination requires that the patient be tilted to a position with the head lower than the feet with continual fluoroscopic examination of the passage of the opaque medium along the spine during the tilting motion. It is desirable to limit the speed of the tilting motion of the table in order to prevent the separation of the opaque medium during the course of the examination and to prevent the depositing of this medium into the patient's sinus.

Other considerations in determining the dynamics of the tilt-table motion are the amount of overall travel time of the table as determined by the operator and the patient's comfort during the tilting of the table. Depending upon the circumstances, the overall travel time is a limiting factor requiring rather high speed motion, while the patient's comfort requires that the speed be limited in order to prevent a feeling of being catapulted due to the shifting of the patient's body from a horizontal to some vertical or less than vertical position at high speed.

Heretofore, tables of this general type have been provided with mechanical drives adapted to position the table in accordance with the type of examination with a constant speed of tilting motion. In order to meet the conditions of tilting motion hereinbefore set forth some types have incorporated various forms of operator control which are subject to variant operations as between different examinations and different operators.

Accordingly, it is an object of this invention to provide an X-ray tilt-table apparatus which automatically overcomes the disadvantages of high speed positioning of the table without sacrificing the overall travel time of the table.

It is another object of this invention to provide a method of tilting an X-ray table with a slow angle motion in the region of the horizontal and with gradually accelerating tilting motion towards the limiting tilted position.

It is a further object of this invention to provide an X-ray table tilting mechanism having a combined lifting and tilting action.

A still further object of this invention is to provide an X-ray tilt table mounting which supports the table for tilting movement and which is free of any encumbrances to the operator.

These and other objects and advantages of the invention will be further understood from the following description when considered in connection with the accompanying drawings, and in the scope as pointed out in the appended claims.

Briefly, in accordance with this invention, I provide a frame which supports in cantilever fashion, an X-ray table mounted for tilting movement from an initial position to some other desired position in either direction and having a tilting mechanism operatively associated therewith. In the preferred form such mechanism comprises crank tilting means adapted to accelerate the tilting movement of the X-ray table from a slow angle motion in the initial position to a more rapid angle motion as it approaches some other desired tilted position, combined with lifting means preferably in the form of a lever linkage system adapted to coact with the crank tilting means to provide a combined lifting and tilting action in order to maintain a minimum predetermined spacing between the lower tilted end of the table and the floor during tilting movement. I further provide control means adapted to coact with the crank tilting means to determine the limiting tilted positions of the table in either direction, together with an auxiliary control which is carried by the table and which operates upon contact pressure with some other object, to stop the crank tilting means and thereby prevent injury to the object.

Figure 8:
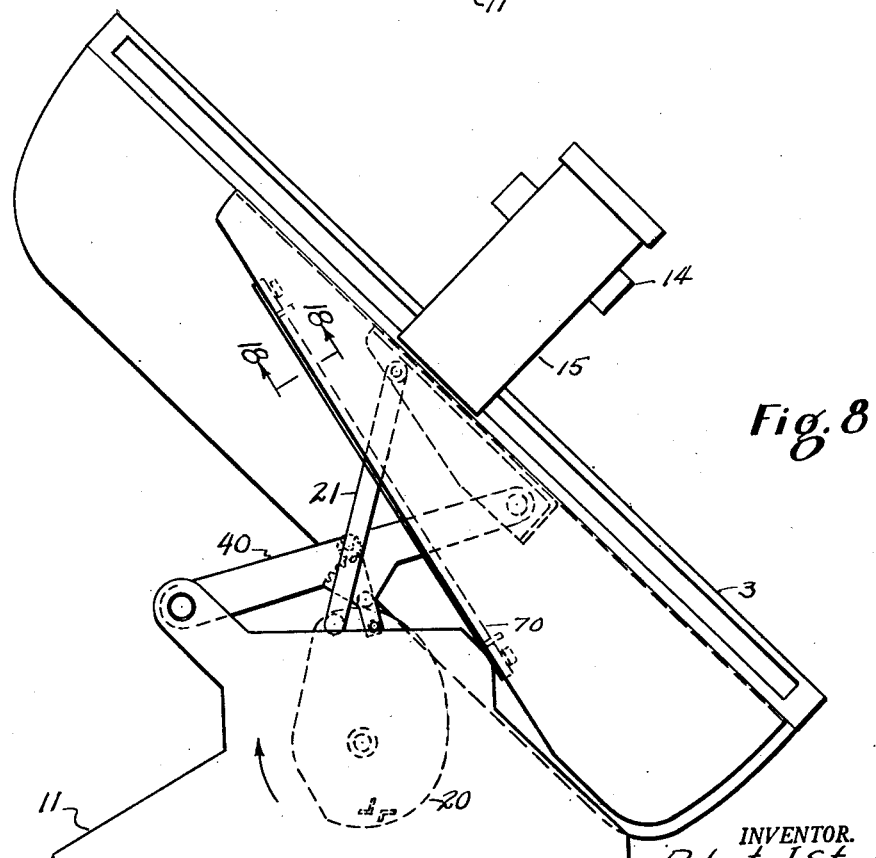
Figure 10:
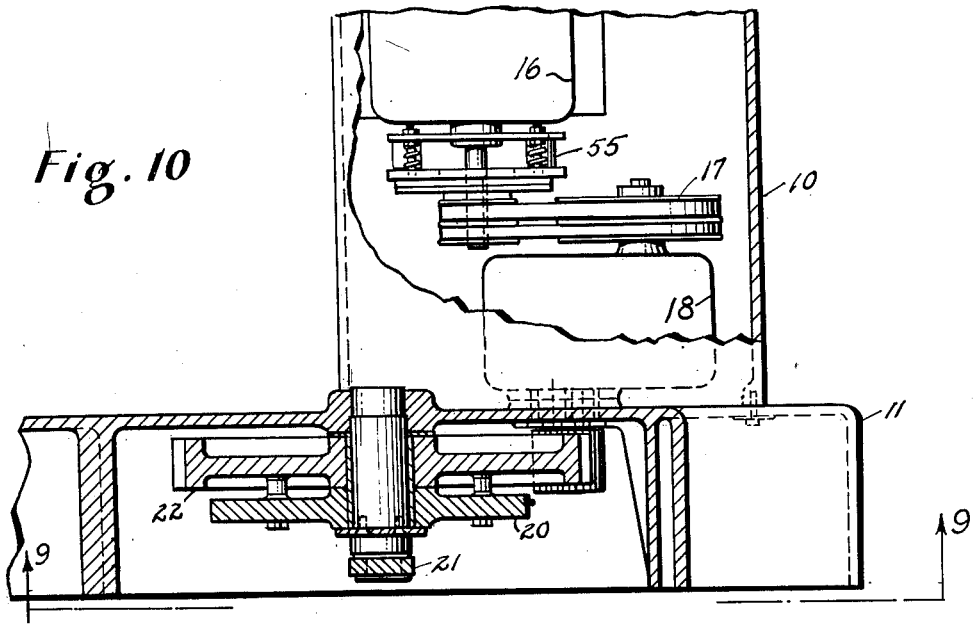
Figure 9:
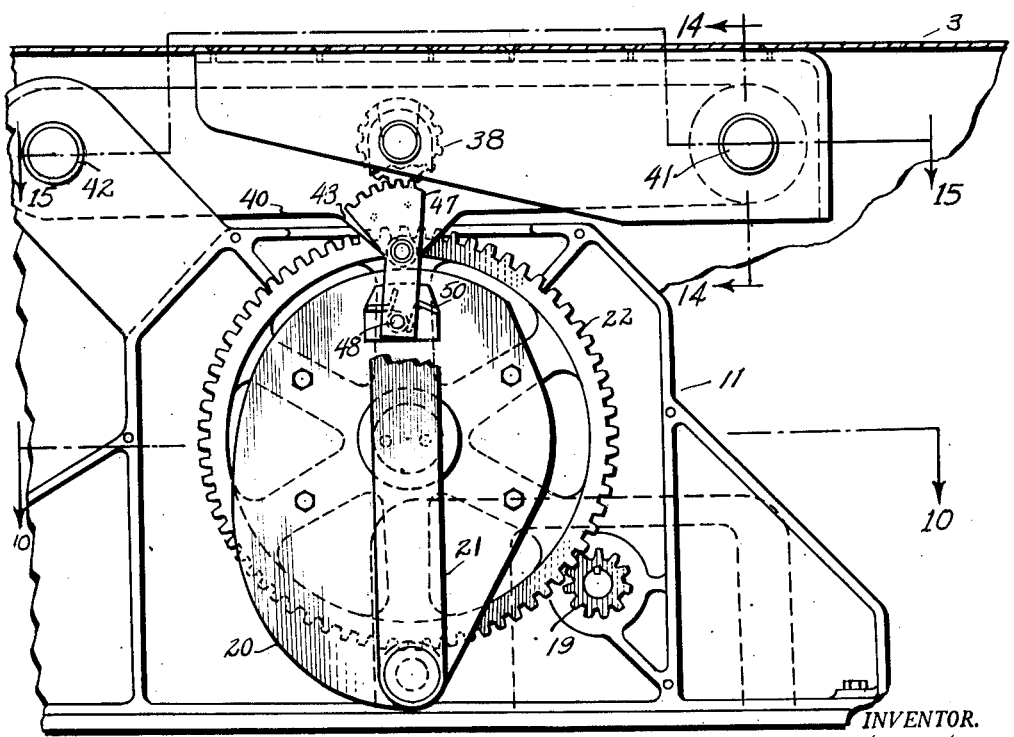
Figure 14:
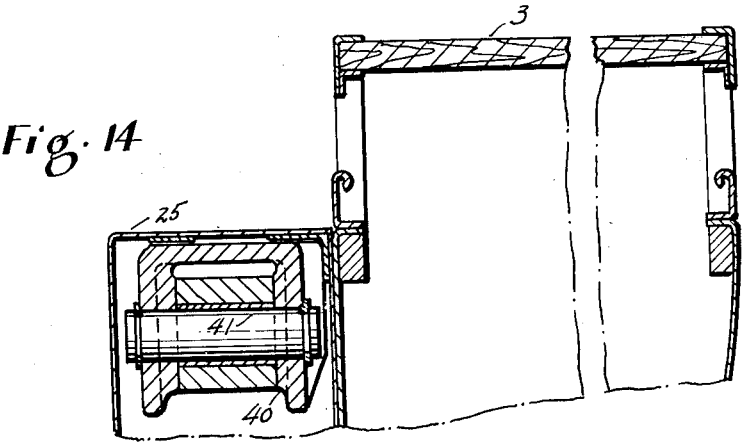
Figure 15:
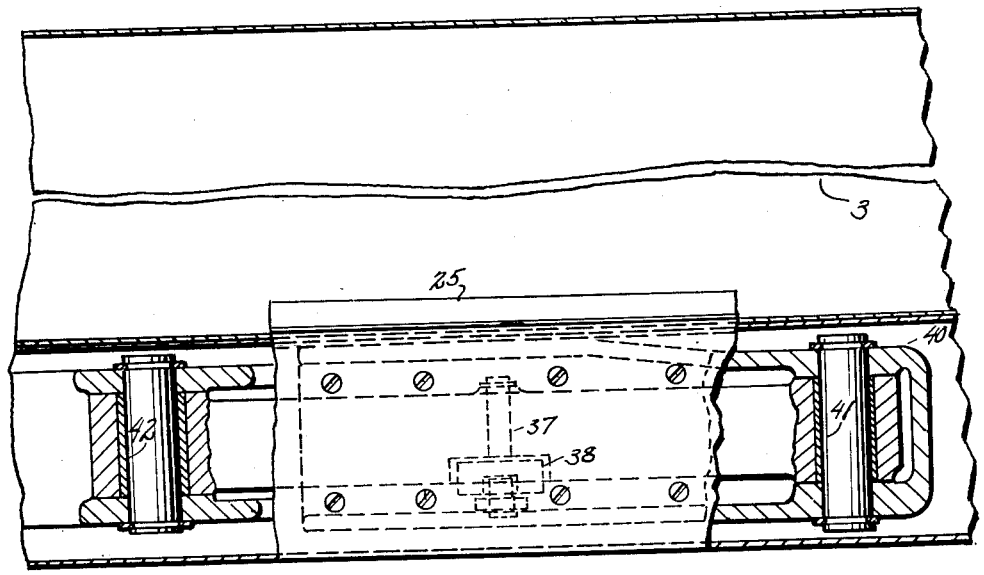

Fig. 1 is a back view of the X-ray apparatus in horizontal position; Fig. 2 is an end view taken from the direction indicated by the lines 2—2 in Fig. 1; Fig. 3 is a partial sectional view of the tilting mechanism taken on the lines 3—3 in Fig. 1; Fig. 4 is a perspective view taken from the front of the X-ray apparatus showing the table top in vertical position; Fig. 5 is a back view of the apparatus showing the table top in vertical position; Fig. 6 is a perspective view taken from the front of the apparatus showing the table top in horizontal position; Fig. 7 is a back view of the apparatus showing the table after it has been partially tilted; Fig. 8 is a back view of the apparatus showing the table tilted to approximately an extreme position in one direction; Fig. 9 is a sectional view taken from the back of the apparatus showing part of the tilting mechanism with the cover plate removed, the view being taken on the line 9—9 in Fig. 10; Fig. 10 is a sectional view taken on the line indicated by 10—10 in Fig. 9; Fig. 11 is a sectional view of the tilting mechanism taken on the plane indicated by the line 11—11 in Fig. 12; Fig. 12 is a section taken on the plane 12—12 in Fig. 11; Fig. 13 is a perspective view of the locking pinion used in connection with the operation of the apparatus; Figs. 14 and 15 are sections taken on planes indicated by the corresponding numbered lines in Fig. 9; Figs. 16 and 17 are wiring diagrams illustrating a circuit arrangement suitable for operation for the apparatus after the manner of this invention; Fig. 18 is a sectional view of the safety control carried by the table top taken along the line 18—18 in Fig. 8; and Fig. 19 is a broken view of the safety control taken from the direction indicated by the line 19—19 in Fig. 18.

The X-ray apparatus shown in the drawings comprises a frame having a base 10 with a supporting frame 11 extending vertically adjacent one side of the base 10. The frame 11 supports an X-ray table 3 mounted for tilting movement relative thereto. The supporting frame 11 carries the tilting mechanism for the table, which mechanism is represented by dotted lines in Fig. 1. The tilting mechanism comprises a cam 20 which carries a crank arm 21 having one end pivotally connected to the cam and the other end pivotally connected to the table. The crank arm 21 coacts with a lever arm 40 which pivotally connects the table 3 to the supporting frame 11 to provide a combined tilting and lifting action for the table as will be hereinafter more fully described. The major elements of the apparatus, thus far described, are shown in their proper relation in Figs. 1 and 2 of the drawings.

The apparatus is also provided with an X-ray tube head 13 and a fluoroscopic screen unit 14 both of which are carried as shown in Fig. 2, by a supporting column 15 extending vertically from the table supporting frame 11. The X-ray tube head 13 and the screen unit 14 may be mounted for pivotal movement relative to the supporting column 15 in any well-known manner so that they may be properly positioned relative to the table when in tilted position.

As shown in Figs. 1 and 2, the tilting mechanism is housed within the supporting frame 11 which is constructed to have sufficient width to support this mechanism and therefore sufficient rigidity to act as the sole support for the X-ray table which extends outwardly from the supporting frame over the base 10 in cantilever fashion. This supporting arrangement provides a clear working area around the X-ray table which is free from any encumbrance to the operator, the patient, or any auxiliary apparatus which may be used in conjunction with the X-ray operation.

The base 10 is hollow and as best shown in Fig. 10 of the drawing carries within the hollow space the crank driving motor 16 which is mechanically interconnected through a V-belt pulley drive 17 and reduction gear box 18 to drive the cam 20 in either direction through the bull gear 22 in the supporting frame housing.

Depending upon the type of X-ray diagnosis or treatment, the X-ray table of this invention is adapted to be tilted from an initial horizontal position as shown in Fig. 1 to either a vertical position as shown in Figs. 4 and 5 or to an intermediate angular position as shown in Figs. 7 and 8. As hereinbefore pointed out, in order to maintain the comfort of a patient and to properly conduct a so-called myelographic examination, it is desirable to have a very slow angle motion or tilting movement of the table in the region of the horizontal position and yet not reduce the overall travel time from this initial position to the ultimately desired tilted position of the table. The dynamics of such a tilting movement may best be resolved by providing practically zero acceleration in the horizontal position with means for gradually accelerating the tilting movement as the table progresses to the ultimate desired or limiting position. The preferred form for accomplishing this embodies a suitable crank arrangement for tilting the table.

Referring to Figs. 9 and 10, the basic components of my crank arrangement are a cam 20, which may be rotated at a constant velocity, and a crank arm 21, which is pivotally connected to the table at one end and at the other end to a point on the periphery of the cam calculated to provide the desired motion. The cam 20 is designed to provide the more rapid angle motion for the table as it approaches a limiting tilted position, and is rigidly bolted to the bull gear 22 which in turn is driven by the pinion 19 from the reduction gearing 18 and motor 16 as previously described.

The crank arm connection to the table is best shown in Fig. 11 to be a pivotal connection through the pin 23 to a saddle member 24 which may be welded or bolted to a skirt or partial housing 25 extending from the table. The supporting saddle 24 should be pivotally secured to the supporting frame 11 at a spaced distance from the pivotal connection of the crank arm to the saddle so that upon rotation of the cam 20, the crank arm would act upon the stationary pivot to tilt the table. Such an arrangement, however, would require that the table be supported sufficiently high from the floor or base to allow the lower tilted end of the table to clear the floor as the table is swung into a vertical position.

In order to provide a practical working height for the table in the horizontal position, I have provided a novel linkage arrangement which coacts with the crank to provide a combined lifting and tilting movement for the table, and enables the table to clear the floor as it is positioned in either a vertical or intermediate angular position, even though the table is not sufficiently high above the floor normally to clear the floor as it is tilted. This arrangement is shown in Figs. 9 and 11 as comprising a lever arm 40 which is pivotally connected at one end to the table through the pivot pin 41 in spaced relation with the pivotal connection of the crank arm 21 to the table. The other end of the lever arm is pivotally connected through a pivot pin 42 to an extension of the supporting frame 11. The lever arm 40 has an integral extension 43 intermediate its ends which carries a cam follower 44 adapted to coact with cam 20.

The coacting relation between the linkage system and the crank system of the apparatus is best shown in detail in Figs. 9, 10, 11, and 12, where it will be seen that the pivotal connection of the lever arm 40 to the table is actually made to the supporting saddle 24 previously described. The lever arm 40, as shown in Fig. 11, is in the form of a hollow girder to reduce the weight which must be supported and moved by the crank arm 21. The follower 44 is freely mounted for rotation on a pin 45 which extends through the cam follower.

The combined action of the crank and linkage arrangements may best be described as follows:

When the table is in the horizontal position, the cam crank arm and lever arm are in the positions shown in Fig. 1. If the cam 20 is driven clockwise, the cam follower 44 rides on the surface of the cam momentarily keeping the supporting saddle and the lever arm 40 parallel, that is, the shape of the cam in this position is such that it elevates the lever arm 40 at substantially the same rate that the crank arm 21 attached to the cam 20 and supporting saddle 24 is trying to elevate the table assembly. As the cam 20 continues to rotate, the supporting saddle 24 is tilted to a maximum of 45 degrees.

As shown in Fig. 8 of the drawings, the purpose of the cam follower 44 attached to the lever arm 40 is to elevate the pivotal connection of the lever arm 40 to the table supporting saddle 24 sufficiently high so that as the table assembly is tilted to 45 degrees, the lower tilted end of the table will clear the floor. The cam 20 is preferably designed so that this pivotal connection rises just sufficiently during rotation of the cam in a clockwise direction to maintain approximately a 3 inch clearance between the sharp curve at the lower tilted end of the table and the floor as shown by the dotted lines 3A in Fig. 7. Inasmuch as the apparatus of this invention is designed to have approximately a 9 inch clearance from the underside of the table body to the floor when the table is in a horizontal position, there is no need for the cam follower 44 to raise the pivot 41 during the initial movement. Thus, the tilting action of the supporting saddle 24 dips the end of the table to the floor to the 3 inch minimum. At this point the rise in the cam then begins to elevate the lever arm 40 at a rate that compensates for the tilt of the supporting saddle 24 so that the clearance between the lower tilted end and the floor is maintained constant throughout the remainder of the tilting angle. This, of course, is a very definite advantage inasmuch as it keeps the lower tilted end of the table at its lowest point during the entire angle of tilt and makes it more convenient for the operator during an X-ray examination to observe the fluoroscopic screen.

The motor 16 is a reversible motor and if the cam is rotated counterclockwise as viewed in Fig. 1 or 5, it will tilt the supporting saddle to a vertical position. Means are provided which coact with the crank arm 21 and the lever arm 40 to lock the table in this vertical position for the examination. Such means will be hereinafter more fully described along with suitable safety features and control mechanisms for the operation of the apparatus.

The locking arrangement for the table in the vertical position is best shown in detail in Figs. 11, 12 and 13 of the drawings. This arrangement comprises a pinion 38 having a radial slot 39 cut in its face and having an integral shaft 37 which is rotatably mounted in the lever arm 40. The crank arm pivot pin 23 normally has one end carried within the radial slot of the pinion 45. A pawl 47 is rotatably carried on the cam follower pivot pin and has gear teeth at one end which are adapted to mesh with the gear teeth on the pinion 38. The other end of the pawl 47 has a pin 46 extending therethrough which carries a roller 48 at one end. The cam 20 carries near its periphery a pair of curved detents 50 between which the roller 48 is to be guided. The detents are so mounted upon the cam 20 that when the cam is rotated in a counterclockwise direction as viewed in Fig. 5, the roller 48 carried by the pawl is guided between the detents, which apply leverage to the pawl. This in turn, rotates the pinion 39 so that the radial slot is turned to a position shown by dotted lines 39A in Fig. 12. At this point the table is in the vertical position and the pivot pin 23 is prevented from further outward movement, thereby preventing the cam from rotating beyond substantially a half revolution and turning the table completely over.

The crank drive is in the form of an electric motor 16 for which electrical controls are provided which will determine the ultimate positioning of the X-ray table in either direction. The control circuits are shown in Figs. 16 and 17 in conjunction with the cam 20 for positioning of the table in either the clockwise or counterclockwise direction. Figure 16 illustrates the switch arrangement for positioning the table as shown in Fig. 8, and Fig. 17 illustrates the switch arrangement for positioning the table as shown in Fig. 5. The motor 16 is shown connected to a power supply through an operating switch indicated on the drawings. The operating circuit also includes safety microswitches 73 and limit switches 60 for determining the ultimate positioning of the table. The limit switches 60 are in the form of a mechanical interlock having a switch arm 61 which may be positioned to make or break the motor circuit.

The switch arm 61 is operated by physical contact with a pin 62 carried on or near the periphery of the cam 20. Thus, referring to Fig. 16, the operating switch may be positioned to drive the motor 16 in a direction to rotate the cam 20 clockwise and when the table top has reached the 45° position of Fig. 8, the pin 62 contacts the switch arm 61 and moves the switch arm 61 away from the contact member 63 to break the motor circuit. The motor 16 may be provided with a brake, such as the solenoid brake 55 which is diagrammatically shown in the drawings, so that upon braking of the motor circuit, the motor is immediately stopped and the table is not tilted beyond the desired or limiting position. Fig. 17 shows the similar action of braking the motor circuit when the cam 20 is rotated in a counterclockwise direction and the table has reached the vertical position of Fig. 5.

As hereinbefore described, the table tilts relative to the supporting frame 11 which is carried adjacent the base 10 and the table is mounted in cantilever fashion, extending outwardly from this frame. It is conceivable that an operator might carelessly place an object or some part of his person between the supporting frame 11 and the lower edge of the table body during the tilting operation. In order to prevent injury to the object or operator in such event, I have provided a safety device or auxiliary control which is adapted to stop the tilting motion of the table immediately upon contact with some extremity of the operator or other object which may be inserted between the lower edge of the table body and the supporting frame. This safety device is shown in the apparatus assembly drawings in dotted lines as a pressure bar 70 which is carried by brackets 75 that are affixed to the table adjacent the lower edge 76 thereof. The bar is connected to the brackets by a pin and slot connection 77. A leaf spring, not shown, may be provided intermediate the ends of the pressure bar to keep the bar extended towards the edge of the table body.

The safety device is best shown in detail in Figs. 18 and 19 of the drawings, where it may be seen that the pressure bar 70 has only the lower edge thereof exposed. Mounted along the lower edge of the table body are micro-switches 73 which are adapted to coact with the ends of the pressure bar 70 acting as a switch arm, upon movement thereof to open the motor circuit of Figs. 16 and 17. Thus, the moment the pressure bar 70 is moved by virtue of contact pressure with some object as previously described, one or the other of the micro-switches 73 is opened to prevent further tilting of the table until the cause of the contact pressure is removed. The pressure bar 70 is mounted to float at either end, and thus can operate on either of the micro-switches 73.

The method and apparatus of this invention provides many distinct advantages over known types of apparatus by reason of the cranking action which gradually accelerates the tilting movement of an X-ray tilt table from an initial position to some other desired position without sacrificing the tilting travel time of the table. This, in combination with a unique linkage system, provides a compound lifting and tilting action for the table which maintains the height of the table at a desirable distance from the floor. Other improvements and advantages incidental to the principal objects of this invention are provided in the form of positioning controls, auxiliary safety devices, and novel means for locking the table in the limiting positions.

I claim:

1. An X-ray apparatus comprising in combination, a frame, a table mounted on a frame for tilting movement from an initial position to some tilted position relative to said frame, table tilting means coacting between the frame and the table and table lifting means including a compound pivotal connection between the table and frame coacting therewith to maintain a predetermined spacing between the lower tilted end of said table and the floor or base of said frame during the tilting operation.

2. A mechanism for tilting an X-ray table from an initial position to some tilted position relative to a supporting frame comprising in combination, a cam rotatably carried by said frame, a crank arm connected at one end to the periphery of said cam and at the other end to said table, said cam and crank arm coacting to tilt said table, drive means for rotating said cam at a substantially constant velocity, and an auxiliary control carried by said table adapted to stop said drive means in the event of an obstruction being interposed into the path of movement between the table and frame.

3. Mechanism for tilting an X-ray table from an initial position to some tilted position relative to a supporting frame comprising, a compound pivotal connection between the table and frame, a cam rotatably carried by said frame, a crank arm connected at one end to the periphery of said cam and at the other end to said table, means for rotating said cam in either direction to tilt said table about the compound pivot to an intermediate angle in one direction and to a vertical position in the other direction, and means cooperating with said crank arm locking said table in the vertical position.

4. Mechanism for tilting an X-ray table relative to a supporting frame comprising, a cam rotatably carried by said frame, a crank arm pivotally connected at one end to the periphery of said cam and at the other end through a pivot pin to said table, means for rotating said cam in either direction to tilt said table to an intermediate angle in one direction and to a vertical position in the other direction, a lever arm pivotally connecting said frame to said table in spaced relation from said crank arm connection, a cam follower carried by said lever arm, said lever arm and cam follower coacting with said cam and crank arm to effect a combined tilting and lifting movement of said table relative to said frame, a pinion having an open slotted face mounted for free rotation on said lever arm, said crank arm and table pivot pin carried within the slot during vertical positioning of said table, and means carried on said cam cooperating with said pinion to rotate the pinion in a direction to lock said crank arm pivot pin against further tilting movement when the table is in the vertical position.

5. A mechanism for tilting an X-ray table from an initial position to some tilted position relative to a supporting frame comprising in combination, a compound pivotal connection between the table and frame, a cam rotatably carried by said frame, a crank arm connected at one end to the periphery of said cam and at the other end to said table, said cam and crank arm coacting to tilt said table about the compound pivot, a driving motor operatively connected to rotate said cam and tilt said table in either direction, a source of power therefor, a circuit interconnecting said source of power and said motor including a switch, means on said cam to operate said switch in a limiting position of said table, means for positively braking said motor upon operation of said switch, a second switch in said circuit and a switch arm carried by said table to open said second switch in the event of an obstruction being interposed into the path of movement between the table and frame.

6. An X-ray apparatus comprising in combination, a frame, a table mounted for tilting movement from an initial position to some tilted position relative to said frame, table tilting means carried by said frame and operatively connected to tilt said table from said initial position to said tilted position, table lifting means coacting therewith for maintaining a predetermined spacing between the lower tilted end of said table and the floor or base of the frame during tilting movement, and an auxiliary control carried by said table to stop said crank tilting means in the event of an obstruction being interposed into the path of movement between the table and frame.

7. A mechanism for tilting an X-ray table from an intitial position to some tilted position relative to a supporting frame comprising in combination, a cam rotatably carried by said frame, a crank arm connected at one end to the periphery of said cam and at the other end to said table, said cam and crank arm coacting with said table to gradually accelerate the tilting movement in either direction from an initial position to some other desired position, a lever arm pivotally connected at one end to said table in spaced relation from said crank arm, said lever arm connected at the other end to said frame, a cam follower carried by said lever arm to coact with said cam, said lever arm and cam follower coacting with said cam and crank arm to maintain a predetermined spacing between the lower end of said tilting table and the floor or base of said frame during tilting movement, an electric motor operatively connected to rotate said cam in either direction and thereby tilt said table to an intermediate angle in one direction and to a vertical position in the other direction, means coacting between said lever arm and crank arm to lock said table in the vertical position, a source of power for said motor, a circuit interconnecting said source of power and said motor including switch means, means on said cam to operate said switch means to open the circuit in a limiting position of said table in either direction, means for positively braking said motor upon operation of said switch means, a second switch in said circuit, and a switch arm carried by said table to open said second switch upon contact pressure of the switch arm with some other object.

8. An X-ray apparatus comprising in combination, a frame, a table mounted for tilting movement from an initial position to some tilted position relative to said frame, table tilting means carried by said frame operatively connected to tilt said table to an intermediate angle in one direction and to a vertical position in the other direction, table lifting means coacting therewith for maintaining a predetermined spacing between the lower tilted end of said table and the floor or base of the frame during tilting movement, control means operatively coacting with said crank tilting means to determine the limiting position of said table in either direction, and an auxiliary control carried by said table to stop said crank tilting means in the event of an obstruction being interposed into the path of movement between the table and frame.

9. Mechanism for tilting a table relative to a supporting base comprising in combination, a lift lever pivotally connected at one end to the table and at the other end to the base to form a compound pivot, a driven cam mounted for rotation on the base, a tilt lever having one end pivotally connected to the driven cam and the other end pivotally connected to the table for tilting coaction about the compound pivot, and a cam follower carried by the lift lever for engagement with the cam to lift the table during the tilting movement.

References Cited in the file of this patent

UNITED STATES PATENTS

| Number | Name | Date |
| --- | --- | --- |
| 1,727,883 | Humphereys | Sept. 10, 1929 |
| 1,874,582 | Nelson | Aug. 30, 1932 |
| 2,038,327 | Wantz | Apr. 12, 1936 |
| 2,172,941 | Manning et al. | Sept. 12, 1939 |
| 2,217,783 | Bell | Oct. 15, 1940 |
| 2,222,888 | Haupt | Nov. 26, 1940 |
| 2,224,262 | Haupt | Dec. 10, 1940 |
| 2,306,194 | Swaisgood | Dec. 22, 1942 |
| 2,315,786 | Grobe | Apr. 6, 1943 |
| 2,494,746 | Colston | Jan. 17, 1950 |
| 2,534,623 | Pitts | Dec. 19, 1950 |
| 2,552,858 | Mueller | May 15, 1951 |
| 2,568,236 | Kizaur | Sept. 18, 1951 |